3,097,134
PROCESS FOR TREATING CANINE DISTEMPER
Bertil Karl Fredrik Sjögren and Sven Lindvall, Sodertalje, Heinz Werner Heiwinkel, Ostertalje, and Karl Gustav Högberg, Sodertalje, Sweden, assignors to Aktiebolaget Astra Apotekarnes Kemiska Fabriker, a company of Sweden
No Drawing. Filed May 31, 1961, Ser. No. 113,645
15 Claims. (Cl. 167—53)

This invention is concerned with certain novel pharmaceutical preparations and with a novel process for their curative use. In particular, it is concerned with the use of colloids containing iron and a physiologically innocuous carbohydrate, namely dextrin, as stabilizer.

The present invention is based upon the discovery that when an amorphous iron (III)-hydroxide-citrate-complex compound in colloidal form with dextrin as stabilizer, in the following called iron-dextrin, is administered parenterally in extremely limited amounts it acts curatively against canine distemper. The character of the iron-dextrin has been ascertained by physio-chemical methods in the ultracentrifuge.

Canine distemper, also called maladie de Carre, is a specific infectious catarrhal disease of dogs, foxes and minks characterized by fever, dullness, loss of appetite, and a discharge from the eyes and nose. It is caused by a filtrable virus, Tarpeia canis. In many mases this disease progresses beyond caterrhal symptoms to nervous symptoms. Mortality in cases with catarrhal symptoms is about 25% in dogs. In cases with nervous complications, mortality is much higher, generally about 85% to 90%. Although reliable statistic is not available, experience indicates that the mortality in minks and foxes is about the same as in dogs. The distemper infection is often complicated by other secondary infections which are mainly caused by bacteria. Therapy which has been used heretofore could only influence the secondary infection but not the distemper. Cases with nervous symptoms could not be effectively cured by any remedy.

The iron-dextrin preparation of the present invention as a colloidal aqueous solution is administered parenterally, preferably intravenously or intramuscularly. The attending veterinarian in each case will determine the optimum dose for the individual animal being treated. The optimum dosage as well as the effective range of dosage and related factors are functions of such variables as the size, age and sex of the animal, and the particular extent of distemper involved.

In general, the effective dose contains from about 0.005 to about 0.2 milligram of iron per kilogram body weight. The optimum dose varies from about 0.005 to about 0.05 milligram of iron per kg. body weight. Injections are generally given daily or every other day parenterally until from about 2 to about 6 injections have been given.

The iron-dextrin is used in the form of an aqueous solution thereof in sterile, distilled water, generally made isotonic by the addition of a suitable solute, of which sodium chloride, saccharose and glucose are representative examples. Water is the preferred solvent but any physiologically innocuous liquid medium suitable for injection can be used. In a solution of the iron-dextrin with a concentration, corresponding to 1 milligram of iron per milliliter of solution, the sedimentation constant of the polydisperse colloid has a median value of 30 to 60, preferably 45 to 50 Svedberg units, and a maximum value not higher than 100 Svedberg units. Making the assumption, that the colloidal particles are spherical and have a density of 3.4 and that Stoke's law is valid, the sedimentation constants of 45 to 50 Svedberg units correspond to a particle radius of the hydrodynamically equivalent sphere of about 30 Angstrom units and the sedimentation constant of 100 Svedberg units to a particle radius of about 43 Angstrom units.

The present invention includes within its scope pharmaceutical compositions in dosage unit forms suitable for animals within given ranges of weight, each comprising iron-dextrin in an effective amount containing a quality of iron corresponding to the range of weight and satisfying the specific dosage recommended above. Thus, as a rule, each unit would contain not less than about 0.005 milligram and not more than about 5 milligrams of iron. In particular, the invention includes dosage unit forms suitable for parenteral injection. Effective dosages of iron-dextrin, as colloidal solutions in sterile water, are specific embodiments of the present invention. The solutions may be isotonic, if desired. Ampules, vials or other containers generally employed for storage of liquids intended for parenteral administration may suitably be used.

Very dilute solutions of iron-dextrin, suitable for convenient administration and control of the very low dosages required to cure canine distemper, are also embodiments of the present invention. For the very low dosages of the present invention to be administered in accurately measured and conveniently controlled amounts, the iron dextrin should be present in the solution at a concentration containing from about 0.005 to 10 milligrams of iron per milliliter of solution, preferably from about 0.010 to 5 milligrams of iron per milliliter of solution.

The term "physiologically innocuous" as used in this specification, has a meaning well known to those skilled in the art and means that the substance to which the designation is applied is not harmful to the animal organism when administered in the prescribed manner.

The following illustrates the preparation of the iron-dextrin. Dextrin was purified by treatment with activated carbon and precipitation with ethanol. The purified material contained reducing groups corresponding to 63±5 mg. glucose per gram of dextrin. 3.0 kg. of the dextrin was dissolved in 6 liters of redistilled water in which 335 grams of sodium lactate had been dissolved and the pH adjusted to 4.5 with lactic acid. At a temperature of 60° C. a water solution of 2.24 kg. of ferric chloride hexahydrate was added gradually, the mixture being kept neutral by addition of 5 N sodium hydroxide. Finally the pH was adjusted to 8.2. The iron-dextrin was precipitated from the solution by addition of 4 volumes of 80% ethanol. The precipitate was collected by filtration and then dissolved in 12 liters of redistilled water in which 310 grams of sodium lactate and 110 grams of lactic acid had been dissolved. The temperature was kept at 60° C. The pH was then adjusted to 8.2 with 5 N sodium hydroxide, and the iron-dextrin was reprecipitated with ethanol and collected as described above. The precipitate was then thoroughly washed with ethanol and dried in vacuo. The yield was from 2800 to 3000 grams of a dry preparation, containing 14.3±1.0% of iron. A solution containing the desired amount of iron (generally from 0.010 to 5 milligrams iron per ml. of solution) was then prepared by dissolving the calculated amount of the dry iron-dextrin compound described above in a solution of citric acid in redistilled water, containing in each ml. 0.35 mg. citric acid per mg. iron calculated. The solution was then made isotonic by the addition of sodium chloride and the pH adjusted to 7.4 with N sodium hydroxide. Instead of sodium chloride, saccharose can be used. The iron-dextrin was present as colloidal particles having a sedimentation constant, which median value is 30 to 60, preferably 45 to 50 Svedberg units and which maximum value is not higher than 100 Svedberg units. After sterilization by filtration the solution was dispensed in ampules under aseptic conditions.

The product and process of the invention will be further illustrated by the following clinical tests.

CLINICAL TESTS

In clinical tests 165 dogs suffering from canine distemper were used. These dogs were divided into two groups, one—consisting of 95 dogs—was treated with the iron-dextrin and the other—consisting of 70 dogs—with Aureomycin (a proprietary brand of chlortetracycline). Of 52 dogs which had distemper with nervous symptoms, 32 were treated with the iron-dextrin and 20 were treated with Aureomycin.

The iron-dextrin was given intravenously in some cases and intramuscularly in other cases, there being no obvious difference in effect when it was given intramuscularly or intravenously. The Aureomycin was given orally.

The mean dosage of the iron-dextrin was 0.05 milligram of iron per kg. body weight every second day. The Aureomycin was given in dosages of 20–50 milligrams per kg. body weight two to four times daily.

The treatment of the two groups of dogs was continued until the dogs had recovered for two days and showed normal temperature, or until it was evident that the dogs could not recover. The mean number of injections of the iron-dextrin was 3 (range 2–6). The Aureomycin was given usually under six days (range 4–9 days). The result of treatment was characterized as positive, if the dog recovered and was free from distemper for six months. The result of treatment was characterized as negative if the dog died, or did not recover in a reasonable time, or had a relapse in the six months' period after the beginning of the treatment.

A tabulation of these clinical tests is set forth in Table I below.

Table I

| Type of Distemper | Treatment with— | Number of Cases | Recovered Number of Cases | Percent |
|---|---|---|---|---|
| A. Catarrhal | }Iron-dextrin | 63 | 52 | 82.5 |
| B. Nervous |  | 32 | 15 | 47 |
| A+B |  | 95 | 67 | 70.5 |
| C. Catarrhal | }Aureomycin | 50 | 34 | 68 |
| D. Nervous |  | 20 | 3 | 15 |
| C+D |  | 70 | 37 | 53 |

Table I shows that 67 dogs (70.5%) recovered when treated with the iron-dextrin preparation, but that only 37 dogs (53%) recovered when treated with Aureomycin. The difference of 16.5% between A+B and C+D is statistically significant ($0.05>p>0.01$).

Of the 32 cases with nervous distemper treated with the iron-dextrin, 15 dogs (47%) recovered. However, of the 20 cases with nervous distemper treated with Aureomycin, only 3 dogs (15%) recovered. This difference of 32% between B and D is statistically significant ($0.05>p>0.01$).

The above clinical results clearly establish that the iron-dextrin of the invention is effective in the treatment of dogs having distemper in comparison with a treatment with Aureomycin. This antibiotic has according to general experience no influence on the development and the cure of canine distemper. The effect of the treatment with the iron-dextrin is especially remarkable in cases where the dogs suffered from distemper, aggravated by nervous symptoms.

A further experiment was made at a mink farm, where a severe form of canine distemper had developed. The stock of animals consisted of two strains of minks, namely the "Standard" and the "Pastel." The "Standard"-mink is more resistant towards canine distemper and also towards other diseases than the very sensitive "Pastel"-mink. All animals had been vaccinated about 6 weeks before the beginning of the experiment. Vaccination was evidently of little value—especially in minks belonging to the "Pastel"-strain—as it could not prevent the infection from spreading very quickly. A number of 174 "Standard"-minks and 114 "Pastel"-minks were treated intramuscularly with an amount of the iron-dextrin preparation, corresponding to 0.05 milligram of iron per kg. body weight, before they showed any signs of infection. The injections were repeated four times and made every other day. 421 "Standard"-minks and 115 "Pastel"-minks served as controls.

A tabulation of these clinical tests is set forth in Table II below. In the symbols SE, SC, PE and PC appearing in this table the letter S stands for Standard mink, P for Pastel mink, E for Experimental group, and C for Control group. These symbols are included in Table II only to connect the entries in the table with the statistical calculations set forth below the table.

Table II

| Strain of Mink | Group | Test Substance | Number of Animals | Mortality (percent) | | |
|---|---|---|---|---|---|---|
| | | | | 1 week after end of treatment | 2 weeks after end of treatment | 4 weeks after end of treatment |
| Standard | SE | Iron-dextrin | 174 | [1] 3.4 | [2] 3.4 | [3] 3.4 |
|  | SC | Control | 421 | [1] 8.1 | [2] 9.5 | [3] 10.7 |
| Pastel | PE | Iron-dextrin | 114 | [4] 17.5 | [5] 25.4 | [6] 36.8 |
|  | PC | Control | 115 | [4] 50.5 | [5] 53.1 | [6] 60.0 |

Statistical calculations:
[1] $0.05>p>0.01$ for the difference between groups SE and SC (*).
[2] $0.05>p>0.01$ for the difference between groups SE and SC (*).
[3] $0.01>p>0.001$ for the difference between groups SE and SC (**).
[4] $p<0.001$ for the difference between groups PE and PC (***).
[5] $p<0.001$ for the difference between groups PE and PC (***).
[6] $p<0.001$ for the difference between groups PE and PC (***).

In the statistical calculations herein the symbol "$p$" is an abbreviation of the term "probability" used in the science of statistics. The expression $0.05>p>0.01$ means that the probability $p$ for the calculated difference between two test groups to be the result of random variations is less than 5% and more than 1%. This degree of probability is conventionally labelled as one-star significance (*). Analogously the expression $$0.01>p>0.001$$

is used to indicate that the probability for the calculated difference to be the result of random variations is less than 1% but more than 0.1%, and this degree of probability is usually called two-star significance (). The expression $p<0.001$ indicates that the probability for the calculated difference to be the result of random variations is less than 0.1%, and this degree of probability is usually called three-star significance (*).

It will be appreciated that various modifications and changes can be made in the product and process of the invention without departing from the spirit thereof and accordingly the invention is to be limited only within the scope of the appended claims.

This application is a continuation-in-part of application Serial No. 715,207, filed February 14, 1958, now abandoned.

What is claimed is:

1. A process for treating canine distemper which comprises parenterally injecting an animal having canine distemper with a colloidal solution of an amorphous iron (III)-hydroxide-citrate complex compound with dextrin as stabilizer in a dosage containing from about 0.005 milligram to about 0.2 milligram of iron per kilogram of the animal's body weight at effective intervals until at least from about two to about six injections have been given, said iron compound having a median sedimentation constant of 30 to 60 Svedberg units and a maximum sedimentation constant of 100 Svedberg units.

2. The process as set forth in claim 1 wherein the injections are given intravenously.

3. The process as set forth in claim 1 wherein the injections are given intramuscularly.

4. A process for treating canine distemper which comprises parenterally injecting a dog having canine distemper with a sterile, aqueous, colloidal solution of an amorphous iron (III)-hydroxide-citrate complex compound with dextrin as stabilizer in a dosage containing from about 0.005 milligram to about 0.2 milligram of iron per kilogram of dog's body weight at intervals of every other day until about six injections have been given.

5. A process as set forth in claim 4 wherein the iron compound has a median sedimentation constant of 30 to 60 Svedberg units and a maximum sedimentation constant of 100 Svedberg units.

6. A process for treating canine distemper which comprises parenterally injecting a dog having canine distemper with a sterile, aqueous, colloidal solution of an amorphous iron (III)-hydroxide-citrate complex compound with dextrin as stabilizer in a dosage containing from about 0.005 milligram to about 0.2 milligram of iron per kilogram of dog's body weight daily until about six injections have been given.

7. A process as set forth in claim 6 wherein the iron compound has a median sedimentation constant of 30 to 60 Svedberg units and a maximum sedimentation constant of 100 Svedberg units.

8. A process for treating canine distemper which comprises parenterally injecting a mink having canine distemper with a sterile, aqueous, colloidal solution of an amorphous iron (III)-hydroxide-citrate complex compound with dextrin as stabilizer in a dosage containing from about 0.005 milligram to about 0.2 milligram of iron per kilogram of mink's body weight at intervals of every other day until about six injections have been given.

9. A process as set forth in claim 8 wherein the iron compound has a median sedimentation constant of 30 to 60 Svedberg units and a maximum sedimentation constant of 100 Svedberg units.

10. A process for treating canine distemper which comprises parenterally injecting a mink having canine distemper with a sterile, aqueous, colloidal solution of an amorphous iron (III)-hydroxide-citrate complex compound with dextrin as stabilizer in a dosage containing from about 0.005 milligram to about 0.2 milligram of iron per kilogram of mink's body weight daily until about 6 injections have been given.

11. A process as set forth in claim 10 wherein the iron compound has a median sedimentation constant of 30 to 60 Svedberg units and a maximum sedimentation constant of 100 Svedberg units.

12. A process for treating canine distemper which comprises parenterally injecting a fox having canine distemper with a sterile, aqueous, colloidal solution of an amorphous iron (III)-hydroxide-citrate complex compound with dextrin as stabilizer in a dosage containing from about 0.005 milligram to about 0.2 milligram of iron per kilogram of fox's body weight at intervals of every other day until about six injections have been given.

13. A process as set forth in claim 12 wherein the iron compound has a median sedimentation constant of 30 to 60 Svedberg units and a maximum sedimentation constant of 100 Svedberg units.

14. A process for treating canine distemper which comprises parenterally injecting a fox having canine distemper with a sterile, aqueous, colloidal solution of an amorphous iron (III)-hydroxide-citrate complex compound with dextrin as stabilizer in a dosage containing from about 0.005 milligram to about 0.2 milligram of iron per kilogram of fox's body weight daily until about 6 injections have been given.

15. A process as set forth in claim 14 wherein the iron compound has a median sedimentation constant of 30 to 60 Svedberg units and a maximum sedimentation constant of 100 Svedberg units.

References Cited in the file of this patent

Lucas: Blood, vol. 7, 1952, pages 358–367.